D. S. ACKLEY.
SAW GUARD.
APPLICATION FILED OCT. 30, 1911.

1,037,843.

Patented Sept. 10, 1912.

Witnesses
Harold O. Van Autwerp
Anna De Windt

Inventor
David S. Ackley
By Luther V. Moulton
Attorney

UNITED STATES PATENT OFFICE.

DAVID S. ACKLEY, OF GRAND RAPIDS, MICHIGAN.

SAW-GUARD.

1,037,843.   Specification of Letters Patent.   Patented Sept. 10, 1912.

Application filed October 30, 1911. Serial No. 657,475.

*To all whom it may concern:*

Be it known that I, DAVID S. ACKLEY, a citizen of the United States of America, residing at Grand Rapids, in the county of Kent and State of Michigan, have invented certain new and useful Improvements in Saw-Guards; and I do hereby declare the following to be a full, clear, and exact description of the invention, such as will enable others skilled in the art to which it appertains to make and use the same.

My invention relates to improvements in saw guards, and more particularly to guards for circular saws, and its object is to provide a thoroughly effective device and to provide the same with various new and useful features hereinafter more fully described and particularly pointed out in the claims.

My device consists essentially of a hood or cover for the upper part of the saw the same being pivoted at the rear, extended at the front beyond the saw and adapted to yieldably engage the upper surface of the lumber at the front thus effectually protecting the front of the saw and holding the lumber down upon the saw table and also adjustable for saws of various diameters, as will more fully appear by reference to the accompanying drawings, in which:—

Figure 1:
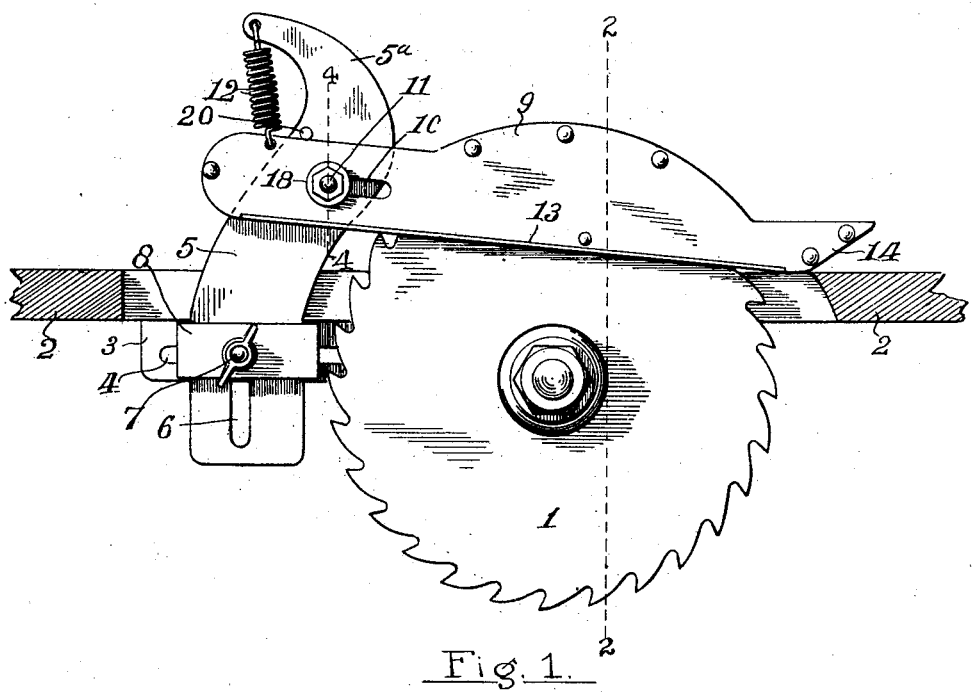
Figure 2:
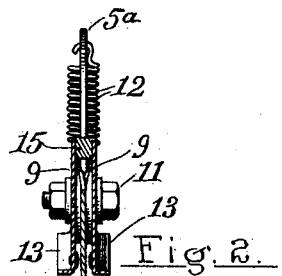
Figure 3:
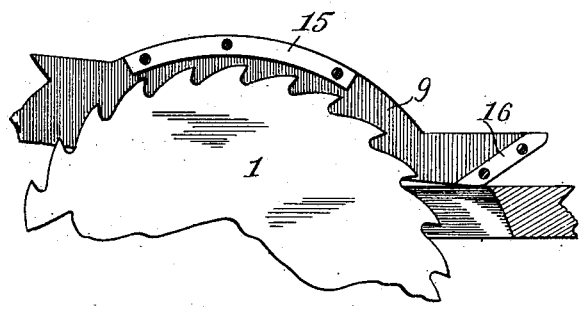
Figure 4:
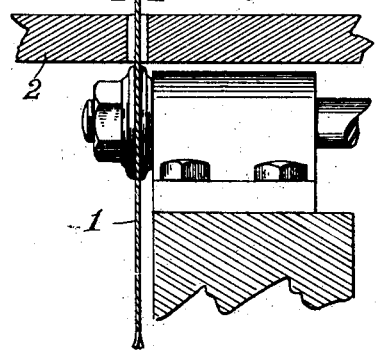

Figure 1 is a side elevation of a device embodying my invention; Fig. 2 a vertical section of the same on the line 2—2 of Fig. 1; Fig. 3 a detail partially in longitudinal section and Fig. 4 an enlarged detail of the pivot mechanism in vertical section on the line 4—4 of Fig. 1.

Like numbers refer to like parts in all of the figures.

1 represents a circular saw and 2 the saw table.

3 is an angle bar secured to the under side of the table and having its vertical member provided with a longitudinal slot 4.

5 is an arm extending upward at the rear of the saw and through the slot in the saw table adjustably clamped to the vertical member of the angle iron. This arm is provided with a vertical slot 6, and 8 is a transverse clamp opposite the slot 4.

7 is a bolt extending through the slots 4 and 6 in the angle iron and arm, and through the clamp 8 whereby the arm is adjustable both vertically and horizontally as occasion may require to accommodate different diameters of saws. The arm 5 is also extended upward and rearward as at 5ª.

The guard proper or hood comprises plates 9 arranged at the respective sides of the saw and projecting above the upper part of its periphery being spaced apart by spacing members 15 and 16 secured therebetween the member 15 being segmental and above the saw and the member 16 between the forward ends 14 of the plates 9. These forward ends extend beyond the saw and have a forwardly and upwardly inclined front face whereby the stock will slide under the same as it is pushed toward the saw and the guard will rise and yieldably slide along the surface of the lumber. The members 15 and 16 are preferably spaced apart leaving an opening or slit between the plates 9 through which the saw may be seen by the operator. This forward extension of the plates thus serves as a complete protection against accident, being at all times interposed between the hand of the operator and the saw and normally lowered in front of the saw when there is no lumber under the same. The plates 9 are rearwardly extended at each side of and beyond the arm 5 embracing the same. A contractile spring 12 is preferably provided to increase the pressure of the guard on the lumber being connected at its respective ends to the upper end 5ª of the arm and the guard at the rear of its pivot. This guard is pivoted to the arm to turn freely in a vertical plane and is preferably adjustable longitudinally on the pivot.

17 is a sleeve rotative in the arm 5 and with its ends engaging the inner surfaces of the plates 9 which are clamped against the same by washers 18 on a bolt 11. This bolt extends through longitudinal slots 10 in the plates whereby the latter may be adjusted longitudinally on the bolt and secured in such adjustment by tightening the nut. The arm 5 being thinner than the space between the plates 9, filling washers 19, are provided therebetween to insure parallel relation between the plates and the arm. Obviously if an arm of sufficient thickness is used the washers 19 are omitted. This construction of the pivot mechanism insures free movement of the guard about the axis of the bolt and maintains the same in a vertical plane.

To insure rigidity of the lower edges of the plates and also that they may be freely slidable on the surface of the lumber they are provided with outwardly extended flanges 13 at their lower edges.

In sawing lumber of moderate thickness, the device is adjusted substantially as in the drawings and thus when there is no lumber under the guard it will rest at its forward end upon the saw table. In sawing thicker lumber the guard is raised and to insure entering the lumber beneath the same it is limited in its downward movement at the front by a pin 20 in the arm at the rear of the pivot, and for thicker lumber, the guard will thus be normally above the table at the front somewhat less than the thickness of the lumber.

By this construction there is no liability of getting the hand under the forward end of the guard and in contact with the saw or of the saw lifting the board off the table which accidents sometimes occur with saw guards as ordinarily constructed.

What I claim is:—

1. A saw guard, comprising side plates spaced apart to embrace a saw and adapted to extend rearward of the saw, an arm embraced by said plates, a sleeve rotative in an opening in the arm, and a bolt extending through the sleeve and plates and clamping the plates against the opposite ends of the sleeve.

2. A saw guard, comprising side plates spaced apart to embrace a saw, and also adapted to extend oppositely at the front and rear of the saw, spacing members between the plates and above the saw, an adjustable arm embraced by the plates, said plates being slotted opposite the arm, a sleeve rotative in the arm, and a bolt extending through the sleeve and plates and adjustable in the slots to adjustably clamp the plates against the opposite ends of the sleeve.

3. A saw guard, comprising a hood having parallel side plates extending in front of the saw and having an inclined front end said plates also extended rearward of the saw, an arm embraced by the rear extensions of the plates, a sleeve rotative in the arm, a bolt extending through the sleeve and through slots in the plates and clamping the plates against the ends of the sleeve and spacing washers on the sleeve between the plates and arm.

In testimony whereof I affix my signature in presence of two witnesses.

DAVID S. ACKLEY.

Witnesses:
HAROLD O. VAN ANTWERP,
LUTHER V. MOULTON.